June 3, 1958  E. LIDOW  2,837,703
COMPOSITE RECTIFIER ASSEMBLY
Filed April 4, 1955
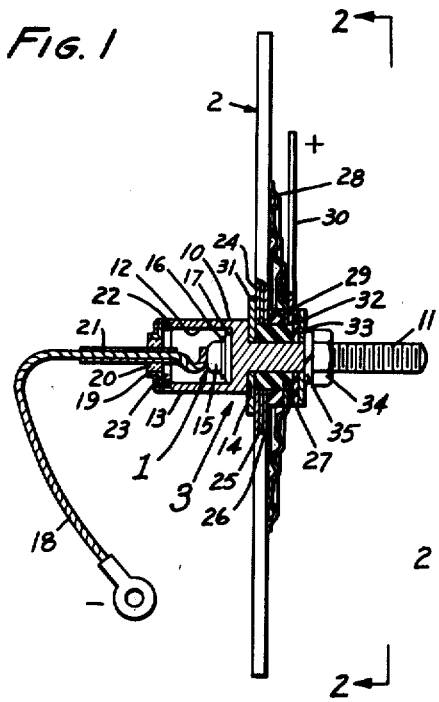
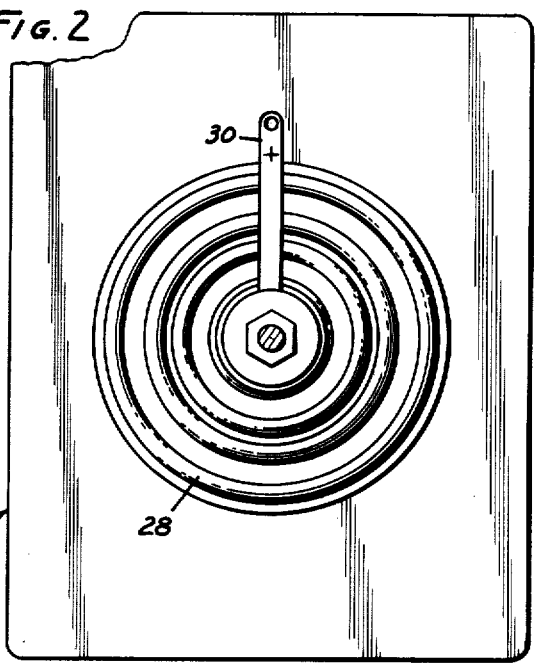
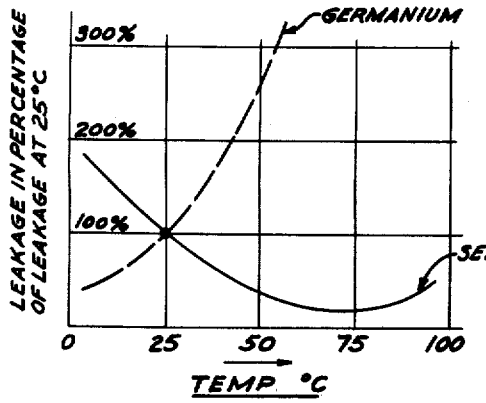
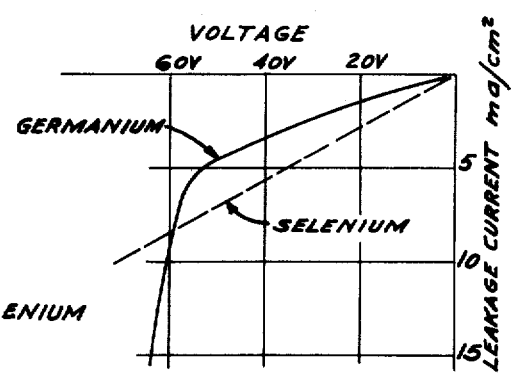
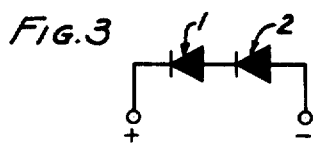
INVENTOR.
ERIC LIDOW
BY
D. Gordon Angus
ATTORNEY.

United States Patent Office 2,837,703
Patented June 3, 1958

2,837,703

COMPOSITE RECTIFIER ASSEMBLY

Eric Lidow, Los Angeles, Calif., assignor to International Rectifier Corporation, El Segundo, Calif., a corporation of California Application April 4, 1955, Serial No. 498,889

9 Claims. (Cl. 317—234)

This invention relates to rectifiers and more particularly to an improved dry rectifier having high efficiency and less susceptibility to temporary voltage surges and to variations in ambient temperature than conventional rectifiers.

In the production of metallic-plate type rectifiers it is a common practice to coat a base plate such as iron or aluminum with selenium, which is a semi-conductor, and then to apply a front electrode such as Wood's metal or other suitable alloy over the selenium. The terminals for the unit are the base plate itself and the front electrode.

It has been a problem to provide a metallic plate type rectifier which is relatively unaffected by temporary voltage surges above the rated voltage limit. This difficulty is due in part to the fact that while a given semiconductor may have a suitable reverse resistance characteristic, it may be unable to absorb a temporarily applied surge of voltage. A voltage surge or overload will cause the conventional rectifier to overheat and destroy its elements.

Another problem is providing an economical rectifier which is not influenced by fluctuations of temperature within a wide ambient temperature range. Semi-conductor rectifiers commonly operate efficiently only within a very limited temperature range, which thereby limits its circuit use.

In accordance with my present invention there is provided an efficient simple means for overcoming these problems. This is done by assembling a composite rectifier comprising dissimilar unilateral conduction elements having different and substantially complementary reverse resistance characteristics and temperature sensitivity. This arrangement has the effect of complementing their resistance and temperature sensitivity characteristics and thereby forming a composite rectifier which is less susceptible than conventional rectifiers to temporary voltage surges and which minimizes the effect of temperature variations over a wide range.

A feature resides in arranging the rectifier elements in such manner that a heat absorption area is formed which increases the rectifiers' efficiency and heat capacity.

In a preferred embodiment of my invention there is provided a metallic mounting means on which is mounted a rectifier having two rectifying portions including a selenium semi-conductor and a germanium semi-conductor. The body of the selenium rectifying portion serves as a cooling fin which receives and dissipates heat generated during rectification by the germanium rectifier. An area adjacent the germanium is a heat absorption area and also serves to conduct heat to the cooling fin.

Silicon, which has rectifying characteristics quite similar to those of germanium in many respects, many under some circumstances be substituted for germanium in the arrangement.

The invention will be described with reference to the accompanying drawings in which:

Fig. 1 is a central sectional view of a dry rectifier in accordance with my present invention;

Fig. 2 is a face view taken along line 2—2 of Fig. 1;

Fig. 3 is a schematic diagram showing the electrical connection of the elements in the rectifier of Fig. 1;

Fig. 4 is a graphic representation of the leakage ratios of a germanium rectifier as compared with a selenium rectifier; and Fig. 5 is a graphic representation of the reverse resistance characteristic of a germanium rectifier as compared with a selenium rectifier.

The rectifier shown in Figs. 1 and 2 is provided with a cylindrical metallic mounting means 10 having an extended stud 11 on one end and a cavity 12 in the other end formed by a walled section 13 in the main body of the mounting means. A shoulder portion 14 is provided by the main body of the mounting means adjacent the junction of the extended stud.

Within the cavity is located a germanium rectifier soldered to the mounting means, shown by the numeral 1, comprising an electrode 15 composed of an indium pellet, a germanium wafer 16 soldered to the front electrode, and a base plate 17 soldered to the germanium wafer.

A conductive lead 18 is joined to the front electrode by suitable means and is supported on the walled section of the mounting means by a hermetically sealed arrangement. Hermetic sealing is effected by securing the mounting means to a metal piece 19 which in turn is secured to a glass-to-metal header 20. A metal tube 21 extends through the seal and is soldered to the conductive lead. A groove 22 is provided in the walled section adjacent the metal piece for receiving a rubber ring 23 which is employed for efficient sealing.

A selenium rectifier is shown by arrow 2 which comprises a base plate 24 which may be of aluminum, onto which a layer of purified selenium 25 is applied as by painting or dusting. The plate may then be given a heat treatment which crystallizes the selenium, thereby increasing its conductivity. A front electrode 26 composed of a suitable alloy such as, for example, tin, cadmium, and bismuth is then sprayed over the selenium layer. The selenium rectifier is supported on the stud of the mounting means by means of an insulator 27. A contact spring 28 is mounted on an insulator ring 29 which engages the front electrode of the selenium rectifier. A terminal 30 is mounted on insulator 26 and engages the contact spring.

A metal contact spacer 31 is axially supported on the stud adjacent the shoulder of the mounting means which mechanically and electrically connects the selenium rectifier to the germanium rectifier.

An insulator washer 32 adjacent the insulator 26 and the terminal electrically isolates the rectifier from a flat washer 33. The stud is threaded in order to receive a nut 34 and a lock washer 35 which when tightened compresses the selenium rectifier against the contact spacer and the shoulder of the mounting means respectively.

The two rectifiers 1 and 2 shown in Fig. 3 correspond to the selenium and germanium rectifiers 1 and 2 of Fig. 1. Fig. 3 shows their relationship in an electrical series arrangement so that current will flow through the germanium rectifier 1 and the selenium rectifier 2.

The graph represented in Fig. 4 shows a leakage comparison between germanium and selenium over a given temperature range. The abscissas represent temperatures over a range of zero to 100° C. and the ordinates represent a percentage of current leakage relative to the leakage (reverse current) at 25° C. for a given voltage. It can be seen that the leakage of the selenium rectifier is at a minimum at approximately 75° C. The minimum leakage for a germanium rectifier, in this temperature range, is shown at approximately 5° C.

Thus, it can be seen that the leakage vs. temperature characteristics of germanium and selenium complement each other; so that a series assembly of selenium and germanium rectifier elements has a tendency to minimize the effect of high temperature.

For, example, assume that a rectifier comprised of selenium and germanium are connected in series and that a voltage is applied across the rectifier. At room temperature and normal operating conditions approximately two thirds of the applied voltage will be dissipated across the germanium element while one third of the applied voltage will be dissipated across the selenium rectifier. If, the rectifier is subjected to 60° C. or 70° C. temperature, most of the voltage will be dissipated across the selenium rectifier since its resistance will be higher than the resistance of the germanium at the higher temperatures. This complementing feature assures rectification of the applied voltage over a wide temperature range without causing the destruction of the elements due to burnout.

This complementing feature of the combined rectifiers is especially important in the case of temporary voltage surges. Germanium, for example, is very sensitive to over-voltages, since it has a very sharp cut-off at the maximum reverse voltage which the rectifier is capable of withstanding. A comparison of the reverse current characteristics of selenium and germanium rectifiers is graphically represented in Fig. 5. The abscissas represent voltage and the ordinates represent leakage current in the reverse direction. Upon inspection of the graph, it can be seen that a fifty volt germanium rectifier may have a leakage of only a few milliamperes at rated voltage, but at voltages which are only 20% above the rated voltage, leakage may be many times as high. The selenium rectifier on the other hand has a gradual leakage increase in linear proportion up to its breakdown voltage.

Thus, it is shown by the two graphs that the temperature sensitivity and reverse resistance characteristics of germanium and selenium serve to complement themselves and thereby provide a more efficient and useful rectifier.

Due to the fact that rectification in a germanium rectifier takes place in a comparatively small area, the heat generated is very intense and therefore cooling is exceedingly important. The larger area of the selenium rectifier plate is arranged in immediate and intimate contact with the germanium junction and acts as an addition cooling fin by providing heat absorption area adjacent to the rectifying area referred to by the numeral 3.

In actual operation, an alternating current is applied across the positive terminal and negative lead. Since the germanium rectifier base plate is affixed to the conducting mounting means a current path is provided from the germanium rectifier portion through the conducting mounting means and the contact spacer to the selenium rectifier portion.

The present invention does not require only the use of a selenium rectifier combined with a germanium rectifier in order to derive efficient usage. Silicon rectifiers for example may be substituted for germanium rectifiers since they have an exceedingly sharp cut-off characteristic in the reverse direction similar to that of germanium rectifiers. Silicon rectifiers however do not exhibit the temperature coefficient problems that are present when germanium rectifiers are used, since silicon rectifiers can be operated satisfactorily to 150° C.

It will be recognized that modifications may be made in the arrangement without departing from the invention; and the foregoing description and the drawing are given by way of illustration rather than of limitation. The invention is not limited except by the scope of the appended claims.

I claim:

1. A composite metal rectifier comprising, in series, a plurality of rectifying elements each having the characteristic of a leakage current which varies with change of temperature over a range of temperatures, one of said rectifying elements having a minimum leakage at one temperature in said range and another of said rectifying elements having a minimum leakage at a different temperature in said range, one of said rectifying elements consisting of a germanium rectifier, and the other of said rectifying elements consisting of a selenium rectifier.

2. A combination according to claim 1 in which a heat absorption means is located between said rectifying elements.

3. A composite metal rectifier comprising a selenium rectifier element having a base plate, a layer of selenium and a counterelectrode, a mounting stud supporting said element and passing through the base plate, a germanium rectifier mounted on the stud at the side of the base plate opposite the selenium layer, whereby said germanium and selenium elements are arranged in series and the base plate serves to conduct heat from the germanium.

4. A composite metal rectifier comprising a selenium rectifier element having a base plate, a layer of selenium and a counterelectrode, a mounting stud supporting said element and passing through the base plate, a silicon rectifier mounted on the stud at the side of the base plate opposite the selenium layer, whereby said silicon and selenium elements are arranged in series and the base plate serves to conduct heat from the silicon.

5. In a static device possessing the ability to pass electric current in a forward direction and offering resistance to the passage of electrical current in a reverse direction, the combination comprising: a metallic housing having an extended stud portion on one end, a germanium semi-conductor located within the housing on the end opposite the stud portion and electrically connected thereto, a selenium rectifier mounted on the stud portion of the housing comprising a front electrode and a base plate separated by a selenium layer, a contact spacer connected to the housing and the base plate, the contact spacer and the base plate serving as a heat absorption area, a contact spring engaged with the front electrode located adjacent the stud portion of the housing and insulated therefrom, and a terminal connected to the contact spring.

6. In a static device possessing the ability to pass electric current in a forward direction and offering resistance to the passage of electric current in the reverse direction the combination comprising: a housing having a stud portion, a first unilateral conduction device comprising a germanium semi conductor means hermetically sealed within the housing and affixed thereto, a second unilateral conduction device insulated from but mounted on the stud portion of the housing comprising a front electrode and a base plate separated by a selenium semiconductor means, and a contact spacer connecting the base plate to the housing for providing an electrical path from the first unilateral conducting device to the second unilateral conduction device.

7. In a rectifier the combination comprising a conducting mounting means, at least two unilateral conduction devices axially supported by the conductive mounting means and having a base plate, a semi-conductive layer and a front electrode means, each of the unilateral conduction devices having dissimilar reverse resistance and temperature sensitivity characteristics, conductive means supported on the conductive mounting means for connecting the base plate of one unilateral conduction device to the base electrode of another unilateral conduction device, and a heat absorption area adjacent the conductive means comprising the base plate of each unilateral conduction device and the conductive mounting means, one of said base plates extending beyond the conductive mounting means as a cooling fin.

8. In a rectifier the combination comprising a metallic mounting means having an extended stud portion on one end and having a cavity formed in the opposite end, a first rectifying portion hermetically sealed within the cavity and affixed to the mounting means, a flexible lead which passes through the cavity and attaches to the first rectifying portion, a second rectifying portion axially supported on the stud portion of the mounting means and insulated therefrom, each rectifying portion having dissimilar temperature sensitivity characteristics, a spring means supported on the stud portion which resiliently engages with the second rectifying portion, an electrically conductive terminal insulated from the stud portion which engages the spring means, a contact spacer axially supported on the stud portion connecting the mounting means to the second rectifying portion and thereby electrically connects the first rectifying portion to the second rectifying portion in series, and a heat absorption area comprising the contact spacer, mounting means, and the second rectifying portion.

9. A combination according to claim 2 in which the heat absorption means comprises a base plate of each rectifying element, one of said base plates extending beyond the conductive mounting means as a cooling fin.

References Cited in the file of this patent

UNITED STATES PATENTS

| | | |
|---|---|---|
| 929,582 | Garretson | July 27, 1909 |
| 1,895,686 | Ruben | Jan. 31, 1933 |
| 1,930,519 | Irion | Oct. 17, 1933 |

UNITED STATES PATENT OFFICE
CERTIFICATE OF CORRECTION

Patent No. 2,837,703　　　　　　　　　　　　　　　　　　June 3, 1958

Eric Lidow

It is hereby certified that error appears in the printed specification of the above numbered patent requiring correction and that the said Letters Patent should read as corrected below.

Column 1, line 66, for "many", second occurrence, read -- may --.

Signed and sealed this 24th day of February 1959.

(SEAL)
Attest:

KARL H. AXLINE
Attesting Officer

ROBERT C. WATSON
Commissioner of Patents